Sept. 15, 1970          F. A. MANFREDI          3,528,225
FLUID INJECTING APPARATUS FOR INTERNAL COMBUSTION ENGINES
Filed Dec. 7, 1966                          2 Sheets-Sheet 1
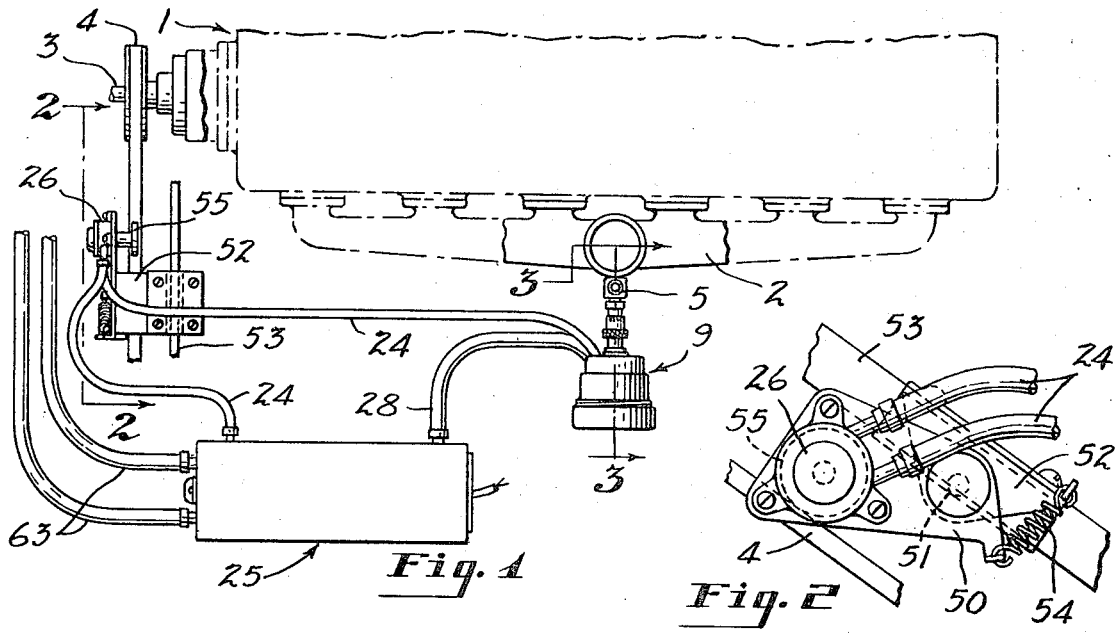
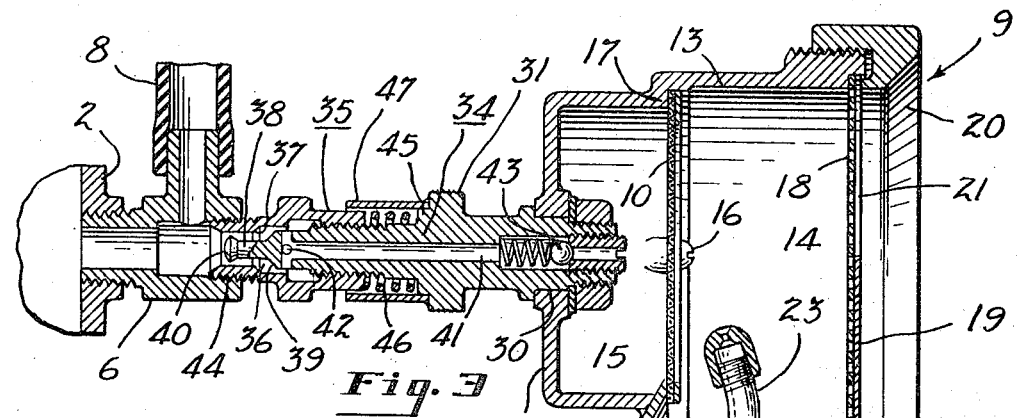
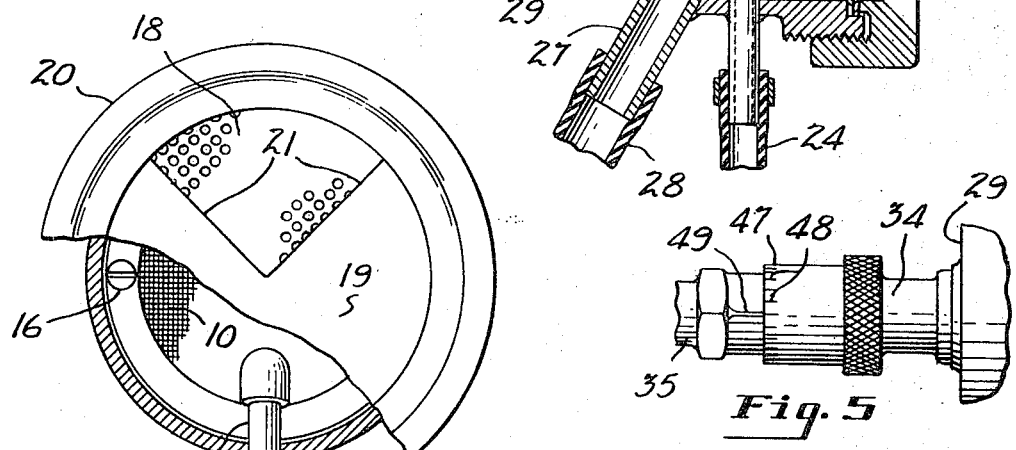
INVENTOR
FRANK A. MANFREDI
BY
ATTORNEYS Sept. 15, 1970      F. A. MANFREDI      3,528,225
FLUID INJECTING APPARATUS FOR INTERNAL COMBUSTION ENGINES
Filed Dec. 7, 1966      2 Sheets-Sheet 2
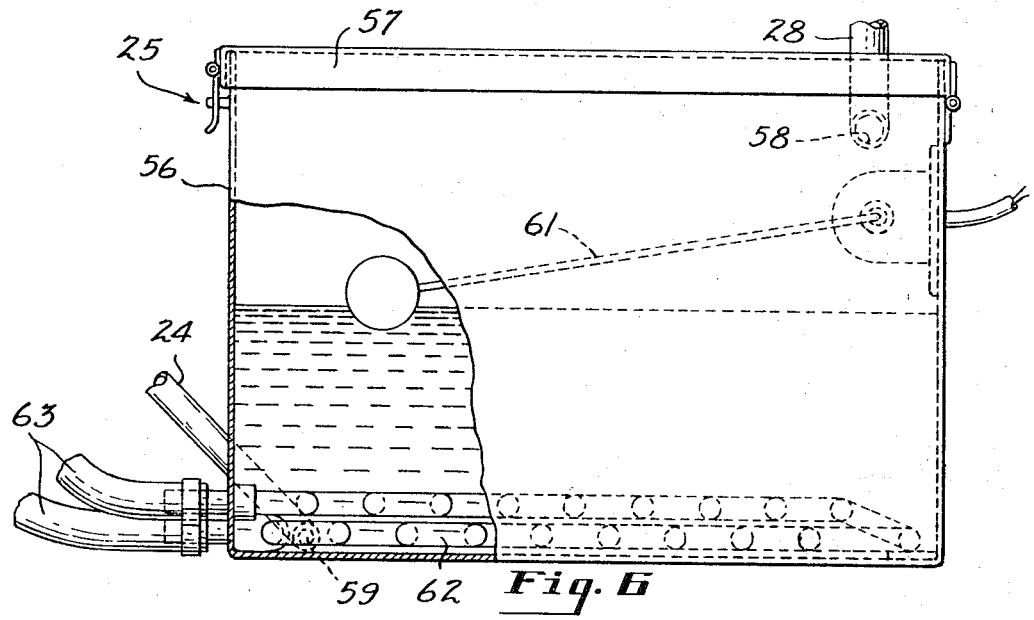
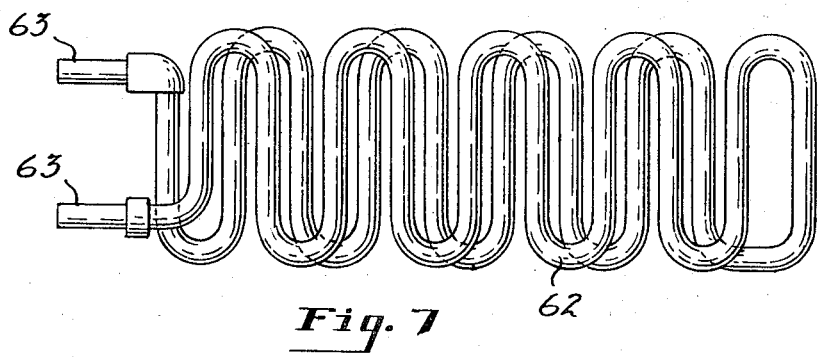
INVENTOR
FRANK A. MANFREDI
BY
McCoy, Greene + Te Grotenhuis
ATTORNEYS

United States Patent Office 3,528,225
Patented Sept. 15, 1970

3,528,225
FLUID INJECTING APPARATUS FOR INTERNAL COMBUSTION ENGINES
Frank A. Manfredi, 2026 W. 95th St., Cleveland, Ohio 44102
Continuation-in-part of application Ser. No. 512,475, Dec. 8, 1965, This application Dec. 7, 1966, Ser. No. 601,502
Int. Cl. B01d *47/00, 50/00;* F02m *25/04*
U.S. Cl. 55—258  13 Claims

ABSTRACT OF THE DISCLOSURE

The apparatus for supplying an air aqueous vapor mixture into the intake system of an internal combustion engine comprises a reservoir for aqueous liquid, a mixing chamber for mixing air with the aqueous liquid and a valve system for regulating the flow of the air aqueous vapor mixture between the mixing chamber and the intake system. The mixing chamber has an air inlet and an aqueous liquid inlet which directs a spray into the air flow from the air inlet to form a mist in the mixing chamber. The outlet of the mixing chamber includes foraminous means for catching droplets and from which the droplets vaporize substantially completely into the air prior to introduction of the air vapor mixture into the intake system.

---

This is a continuation-in-part of application Ser. No. 512,475, filed Dec. 8, 1965 now abandoned.

This invention concerns apparatus for injecting fluids into the intake systems of internal combustion engines, and more particularly relates to aparatus for moisturizing air and for injecting air so moisturized into the intake system of an internal combustion engine.

The present invention accomplishes significant fuel economies with no power loss by moisturizing air with water and injecting such air into the intake manifold of a spark-ignition internal combustion engine and will be discussed hereinafter with reference to this particular purpose, although it is understood that the present invention is not so limited and, in fact, contemplates moisturizing air with other liquids, such as alcohol, or with solutions or with fine particle suspensions including, in one or more of such forms anti-knock additives, decarbonization compounds, exhaust neutralizing chemicals and others for other purposes which will be evident to persons skilled in the art.

A special feature of the present invention is the means for moisturizing the air for injection, which provides highly moisturized air in an uncomplicated and inexpensive manner and which permits the device to be inexpensively manufactured, installed and operated in an automobile engine.

In the drawings:

FIG. 1 is a fragmentary plan view of an engine block showing a fluid injecting aparatus in conformity with this invention mounted on the intake manifold thereof and showing a reservoir for holding a supply of liquid and a pump driven by the engine's fan belt for pumping the liquid to the vaporizing apparatus;

FIG. 2 is an enlarged end view of the pump as viewed from the lines 2—2 of FIG. 1;

FIG. 3 is an enlarged sectional view of the fluid injecting apparatus as viewed from the lines 3—3 of FIG. 1 and showing the apparatus mounted on a crankcase fume return fitting on the engine;

FIG. 4 is an end view with parts broken away of a preferred construction of the wetting housing for the foraminous member in the fluid injecting apparatus shown in FIG. 3;

FIG. 5 is a fragmentary side view of the valved conduit portion of the fluid injecting apparatus shown in FIG. 3;

FIG. 6 is an elevational view with parts broken away and shown in section of a reservoir for use with fluid injecting apparatus of the present invention and showing a liquid level sensitive device for indicating the amount of liquid in the reservoir;

FIG. 7 is a plan view of heat transfer coil for heating liquid in the reservoir.

In the drawings illustrating this invention, a conventional internal combustion engine 1 is provided with the usual intake manifold 2, fan belt drive 3, fan belt 4 and crankcase fume return 5. As shown in FIG. 3, the fume return 5 includes a threaded T-fitting 6, which is fixedly received at one end in the intake manifold 2, and a hose 8 provided at one end of fitting 6 leading from the valve cover (not shown) to carry crankcase fumes into the intake system of the engine for burning.

As illustrated in FIGS. 1 and 3, fluid injecting apparatus 9 in conformity with the present invention is mounted on the fume return elbow 6. This is a satisfactory, convenient method of venting the apparatus 9 into the intake manifold since it obviates the need for removing the manifold to drill a hole into it. It is understood that the present invention contemplates venting the injecting apparatus 9 into the intake system of the engine at several other suitable places including directly into the intake manifold or directly into the base of the carburetor.

Referring in detail to FIG. 3, there is shown a substantially cylindrical housing 13 defining a spraying chamber 14 and a posterior chamber 15 which are separated by a circular foraminous member 10 (a wire screen of approximately 18 Tyler standard sieve mesh) which is fixedly mounted with screws 16 on an annular ledge 17 extending from the inner surface of the housing 13. The outer end of the spray chamber 14 is covered with a perforated plate 18 serving as an air filter which is held in position by a circular cover plate 19 and a circular cap 20 which is internally threaded and screws onto the externally theaded end of a cylindrical housing 13. The cover plate 19 is provided with a quadrantal aperture 21 communicating with the apertures of perforated plate 18.

A nozzle 23 is mounted in the spray chamber 14 and directed toward the spray chamber ceiling adjacent the foraminous member 10 and communicates with a liquid reservoir 25 via a hose 24. A pump is provided at a break in the hose 24 to pump liquids from the reservoir 25, through the hose 24, and out through the nozzle 23.

Spray chamber 14 is provided with a drain outlet 27 at the base of the foraminous member 10 for returning excess liquid to the reservoir through a drain hose 28.

The posterior chamber 15 is defined by the inner cylindrical wall surface of cylindrical housing 13, by the foraminous member 10, and by an end wall portion 29 of the housing 13. End wall portion 29 is provided with an aperture 30 wherein one end of a conduit 31 is journalled for rotation.

In the preferred form of the present invention, the conduit 31 includes an externally threaded male member 34 and a female member 35 internally threaded at one end to receive the male member for relative screw movement.

The female member 35 has an axial passage 36 with an annular seat 37 extending radially inward into the passage. The male member 34 has a stem portion 38 received within the passage 36 of female member 35. The stem 38 has a tapered portion 39 adapted to seat on the annular seat 37 of female member 35. The male member 34 is further provided with a liquid dispersing head 40 extending from the tapered portion 39 of the stem 38.

The male member 34 is provided with an axial passage 41, one end of which communicates with the posterior chamber 15, and the other end of which vents radially through the side of the stem portion 38 at aperture 42, thereby communicating with the passage 36 of female member 35. The passage 36 of female member 35 is wider than the stem portion 38 of male member 34 adjacent the aperture 42 so that fluid may pass out of the passage 41 of the male member 34 via aperture 42 and into the passage 36 of female member 35.

Male member 34 is further provided with a shoulder 45, and a compression spring 46 encircles male member 34, engaging at one end the shoulder 45 and at its other end the adjacent end of female member 35. A hollow cylindrical sleeve 47 is fixedly mounted on the outer surface of shoulder 45 on male member 34 and extends axially therefrom to shield the spring 46. The sleeve 47 is provided with numbered unitary markings 48, about the free edge of its outer surface, and female member 35 is provided with one or more reference markings 49 so that male member 34 and female member 35 may be set and reset with precision at predetermined relative positions.

The pump 26 is fixedly mounted on a mounting plate 50, the latter being pivotally mounted at 51 on a bracket 52 fixedly mounted on a portion of the generator bracket 53. A spring 54 biases the friction drive wheel 55 of pump 26 against the fan belt 4. The present invention is not limited to the use of a mechanical pump 26 but contemplates other means including electrical pumps and other suitable means.

Construction of the reservoir 25 is shown in greater detail in FIG. 6. In particular, the reservoir is comprised of a rectangular container 56 having a hinged cover 57. An inlet 58 is coupled to the drain hose 28 for carrying excess liquid back into the reservoir. An outlet 59 is provided at the base of the container 56 and is coupled with the hose 24 leading to the pump 26. An optional conventional liquid level sensing device 61 is provided in the reservoir and in coupled to a liquid level indicator (not shown) on the automobile dashboard (also not shown). Heat exchanger coils 62 are disposed in the bottom of the reservoir and serve to conduct heated water from the engine cooling system, through the liquid in the reservoir 25, and back into the cooling system via hose 63.

The operation of the apparatus is as follows:

The reservoir 25 is filled with liquid which may be merely water, or which may be or include anti-knock compounds, decarbonization additives or other substances.

When the engine 1 is running, the pump 26 draws liquid from the reservoir 25 through hose 60 and pumps it through the hose 24 and out the nozzle 23 to spray a mist into the spray chamber 14 adjacent foraminous member 10.

Operation of the engine 1 creates suction in the intake manifold 2 which draws air into the spray chamber 14. This air is exposed to the mist and becomes partially moisturized. The air and mist are next drawn to the foraminous member 10. The mist largely adheres to the foraminous member 10, forming larger droplets tending to flow down across the foraminous member 10 openings. Substantially all the foraminous member 10 openings soon are either covered with a liquid film or partially occluded by droplets. As each unit of air passes through one of the wetted openings, it is exposed to a substantially large surface area of water and becomes further moisturized, as does each succeeding similar unit of air. This moisturized air then enters the conduit 31 and passes into the engine intake manifold where it mixes with the air-fuel mixture leaving the carburetor and enters the cylinders for combustion.

The amount of vapor supplied to the intake system of the engine may be regulated by screwing male member 34 into or out of female member 35 to vary the distance between the tapered stem portion 39 of the male member and the seat 37 of the female member. The vapor supply may be completely cut off by closing this valve.

It has long been recognized that internal combustion engines operate better and with greater economy on rainy or very humid days. The inventor believes that this is either because water has a catalytic effect during combustion or because it reacts to form water gas or a combination of both of these. The inventor further believes that it is best to introduce the water to the fuel-air mixture in vapor form, whereby the individual water molecules are relatively separate and thereby more available for interaction with fuel and air particles already present. Similarly, other substances will obtain a more complete mixture when introduced in vapor form or with a high proportion of vapor.

While a certain amount of any liquid will vaporize the intake manifold, it is felt that this is insufficient for relatively high-boiling point liquids such as water to vaporize completely or soon enough prior to combustion of the fuel for satisfactory mixture to occur.

Accordingly, the apparatus of the present invention is designed to obtain highly saturated atmospheric air for injection into the engine and, in this regard several factors are considered to be of special significance.

First, selection of a suitable foraminous member 10 is important. It must have openings which are small enough so that a substantial portion of the air passing through the openings will be exposed to the liquid therein. On the other hand, the openings must not be so small that the flow of air is significantly restricted. The inventor has found 18 Tyler standard sieve mesh wire screen to be satisfactory for many United States passenger automobile engines of intermediate displacement. Even better moisturization obtains from employing one or more additional screens of similar mesh in series so that the air must pass through two or more wetted openings before entering the intake manifold. Different engines may require different mesh sizes, although it is thought that screen of 8 to 40 Tyler standard sieve mesh defines the workable limits for wire cloth mesh sizes and that 12 to 28 Tyler standard sieve mesh delineates the preferable limits of mesh sizes. Generally speaking, low displacement engines may utilize finer mesh, but for most it is believed that, given a screen of mesh within the preferable range, the area of the screen is the more critical specification involved. It is believed that large area screens are required for large displacement engines and smaller area screens may be employed with smaller engines. A relatively small area screen employed with a large engine requires air to be drawn through the screen at a faster rate which reduces fluid pressure on the anterior side of the screen and reduces the proportion of moisturized air which may be taken into the fuel charge.

Other foraminous member types may be employed, and particular those with uniform openings of the prescribed size. Three dimensional (space) lattices will be satisfactory. Sponges and the like are generally too fine or have non-uniform openings and are not preferred although the present invention contemplates the use of specially prepared and arranged materials of this type which conform to the general requirements set forth in preceeding paragraphs. Wire screen is prefered because of its confomity to those requirements and because of its ready availability and low cost.

A second factor considered to be of special significance in the present invention is the utilization of the posterior chamber 15. While not critical to the operation of the invention, it is highly desirable to the extent that large droplets of liquid which form on the foraminous member 10 are likely to be drawn off for foraminous member 10 by air passing through it. These droplets will fall to the floor of the posterior chamber 15 and pass back through the foraminous member to drain out through the drain outlet 27 instead of entering the valved conduit 31. While a small proportion of such droplets will unavoidably enter the intake manifold, it is considered preferable to avoid this since the liquid in this form does not mix with the fuel as well as is less efficient. The fact that the foraminous member 10 is spaced from the mouth to the conduit 31 and that the base of the housing beneth that space is lower than the mouth of the conduit 31 and permits drainage other than into the conduit 31 is accordingly a desirable feature.

A third factor considered to be of special significance in the present invention is the heating of the liquid in the reservoir 25 by heat exchange coils 62. In this regard, it is to be noted that a small heating coil (not shown) may be placed at the air inlet aperture 21 of the wetting housing 13 or other means provided to heat the interior of the housing 13. The construction of such means will be readily apparent to persons of ordinary skill in the art. It is well known that air has a relatively high dew point at relatively high temperatures. Consequently, when the air entering the wetting housing 13 is relatively warm, it will take on greater amounts of moisture. Care must be taken, however, in ascertaining the heat capacity of particular carburetor components since many are not constructed to withhtand temperatures much beyond normal operating conditions and for other reasons. In the winter, however, heat may be employed to advantage since the carburetor is operating substantially beneath its upper temperature limits. Of course, heating means such as the coils 62 are necessary to maintain liquid in the reservoir 56 above freezing temperatures during winter operation. Various anti-freeze compounds, such as alcohol, may be added to the liquid as an alternative, although care should be observed in discerning whether they are damaging to the engine or will otherwise adversely affect its operation. Other heating methods include placing the reservoir 56 and/or wetting housing 13 near or against the engine 1, making them movable to distant positions for hot weather operation.

In this regard it is to be noted that the present invention provides apparatus suitable for injecting the moisturized air at points very close to the combustion chamber. This is considered of importance when utilizing a heated charge of highly saturated air, since any lowering of temperature of such a charge is likely to result in undesirable condensation. Condensation is not a problem in the absence of heated charges since the charge passes only through warmer, lower pressure areas on its way to the cylinder. Although the previously mentioned concept of heating the water and/or air is intended primarily for use in the winter to raise the temperature of the moisturized air charge to the temperature which that charge would have in the summer, it is also considered that the moisturized air charge may be raised above normal summer temperatures so that the charge may contain a higher proportion of water molecules. If this is done, it is necessary to inject such a charge downstream of the carburetor and as close to the cylinder as is practicable since the carburetor operates properly only within fairly narrow temperature limits and the higher temperature of the charge is likely to disturb its operation. One must avoid injecting the charge too close to the cylinder or else the charge will not be thoroughly mixed with the fuel at the time of combustion. A dispersion head such as the head 40 on the conduit 31 shown in FIG. 3 of the drawings is helpful in facilitating proper mixture. Other factors to consider in determining the optimum point for injection of a heated charge include cylinder head design, the amount of valve overlap, and the intake manifold design, all of which play an important part in the mixing turbulence encountered by a fuel charge prior to combustion. Where it is desired to inject the moisturized air into the several legs of the intake manifold, one may employ separate injection devices for each leg, although it is preferred that a single wetting housing 13 and valved conduit 31 are employed with suitable lines leading to each manifold leg, each of which lines is preferably provided with a suitable dispersion head. The modifications necessary for this purpose will be evident to persons of ordinary skill in the art.

A fourth factor of special significance to the present invention is that pressure in the intake manifold is relatively high at low and high speeds and at open throttle. On the other hand, it is relatively low at intermediate engine speeds. Thus, the apparatus supplies the greatest amount of fluid to the intake manifold at intermediate engine speeds. For example, an engine with a top speed of 110 miles per hour may attain peak manifold suction at around 50 miles per hour. A more powerful engine may attain peak suction at higher speeds, and in most cases, the opposite will be true for smaller engines. In the case of the engine of the above example, the apparatus may have significant effect only in the range of from about 20 miles per hour to about 60 miles per hour, with the greatest effect at peak suction speeds (50 miles per hour). Attempts to inject fluids by raising pressure by blowers or other means at the air intake 21 of the wetting housing 13 or at other points in the apparatus of the present invention would result in expanding the range of operation of the device, however this is in the nature of supercharging and requires certain adjustments in the engine design and valve timing to avoid damage to the engine. Those adjustments, however, are well known to persons knowledgeable in the art of supercharge engine design. Accordingly, the present invention contemplates the use of apparatus hereinbefore described in combination with blowers or other means to induce higher pressures in the apparatus for the purposes and to the effect disclosed in engines properly designed and adjusted as will be readily apparent to persons of ordinary skill in the art.

The present invention further contemplates use of apparatus hereinbefore described in standard supercharged engines.

A further factor considered to be of special significance is the point where the apparatus injects the fluid into the engine. Generally, it is preferred to inject the fluid downstream of the carburetor, either at the base of the carburetor or into the intake manifold. It is convenient, on cars having crank-case fume returns as shown at 6 in FIG. 3, to vent the injecting apparatus through the fume return fitting. This obviates the necessity for drilling another hole in the manifold which usually requires that the manifold be removed. It is possible to vent the apparatus into the intake system of the engine upstream of the carburetor, although this is not recommended for reasons including that water and other substances tend to foul or otherwise hinder the carburetor from operating properly.

Certain engines are adjusted to operate with a substantial degree of valve overlap which is intended to scavenge the exhaust manifold. In this manner small amounts of exhaust gases are drawn back into the combustion chamber to mix with fresh fuel for combustion. Such arrangements are usually made for purposes of economy. The present invention contemplates utilizing apparatus herein described to inject moisturized air into the exhaust manifold, near the cylinder, to moisturize the scavenged exhaust fumes as they are being drawn back into the combustion cylinder. For purposes of this specification, the apparatus is here also considered to be injecting fluids into the intake system of the engine.

As an example of the operation of my invention, I have utilized apparatus constructed similarly to the apparatus illustrated in FIGS. 2–5 of the drawings to inject a mixture of air and water into the intake manifold of an automobile engine whereby I have obtained significant fuel economies. The automobile employed was a 1963 Chevrolet stock Impala model having an automatic transmission, single barrel carburetor, and a 6-cylinder engine with about a 230 cu. in. displacement developing approximately 140 horsepower at 4400 r.p.m., having a compression ratio of 8.51, a bore of 3.875 in., and stroke of 3.25 in. The fluid injecting apparatus employed a circular foraminous member approximately 4 inches in diameter constructed of 18 Tyler standard sieve mesh wire screen. The check valve comprised a ball of about 1/8 inch diameter and a cylindrical helical coil compression spring about 3/8 inch long which compresses to about 2/3 of its length under a weight of about 1 oz. At rest, the check valve closes the intake aperture which is approximately 1/16 inch in diameter. The ball of the check valve is housed in a cylindrical chamber approximately 3/16 inch in diameter and 7/16 inch long. The main passage in the male member has a diameter of approximately 1/16 inch. The male and female members were adjusted by trial and error to attain a suitable valve opening. The automobile was then tested on a dynamometer and no power loss was registered. The automobile was then tested for fuel economy and power, both with and without the apparatus in operation. Water temperature in the reservoir was about 75° F. It was found that no significant loss of economy occurred at the highest and lowest speed ranges, and that in the intermediate speed ranges (30–60 miles per hour), the automobile used up to 30 percent less gasoline with the apparatus than without it. In a similar test, less than 2 lbs. of water were consumed in driving the automobile over 600 miles at a fairly constant average velocity of about 45 miles per hour. Again, water temperature was about 75° F. in the reservoir.

There has thus been described apparatus for injecting fluids into the intake system of an internal combustion engine 1, comprising a conduit 31 preferably consisting of a male member 34 provided with a passage 41, and a female member 35 provided with a passage 36 communicating with male member passage 41, said female member passage 36 having an outlet for communication with the intake system of said engine 1, and said male member passage 41 having an inlet aperture; a housing enclosing a spray chamber 14 and a posterior chamber 15, said spray chamber 15 provided with an inlet for communication with the atmosphere and a drain outlet 27, said posterior chamber 15 provided with an outlet communicating with the female member passage 36; a foraminous member 10 disposed between said posterior chamber 15 and said spray chamber 14; a resiliently supported control valve 43 disposed in the male member passage 41 to regulate the flow of fluid therein, said valve tending to open only when the pressure in said passage 41 upstream of said valve 43 is greater than the pressure on the opposed side of said valve 43; and means to supply liquid to the openings of said foraminous member 10, said means preferably comprising a nozzle 23 for spraying a mist of liquid into said spray chamber 14, said nozzle 23 mounted on a hose 24 leading to a liquid storage reservoir 25 and provided with a pump 26 for drawing liquid from said reservoir 25 through said hose 24.

I claim:

1. Apparatus for supplying an air aqueous vapor mixture into the intake system of an internal combustion engine comprising:
 a reservoir for an aqueous liquid;
 a mixing chamber for mixing said air and said aqueous liquid, said mixing chamber having an air inlet and an aqueous liquid inlet which supplies a spray which forms a mist in the mixing chamber, and said mixing chamber having an outlet for the mixture, said outlet being opposite said air inlet so that air flow sweeps the mist out, said outlet including foraminous means for catching droplets and from which said droplets vaporize substantially completely into the air prior to introduction of the air vapor mixture into the intake system; a fluid line for interconnecting an outlet port means of said outlet with the intake system, said fluid line being provided with a valve which is pressure responsive and opens only when the pressure on the upstream side of said valve exceeds the pressure on the downstream side of said valve.

2. In the apparatus of claim 1:
 said foraminous means comprising a plurality of screens in series.
3. In the apparatus of claim 2:
 said screens being between 8 and 40 Tyler standard sieve mesh.
4. In the apparatus of claim 2:
 said screens being between 12 and 28 Tyler standard sieve mesh.
5. In the apparatus of claim 1:
 said air inlet having an air filter means.
6. In the apparatus of claim 1:
 said apparatus having a drainage means; and
 said outlet including an outlet port means spaced from said foraminous means and above a base of said foraminous means whereby excess moisture can be removed from said chamber through said drainage means and the passage of droplets out through said outlet port and into said intake system is minimized.
7. In the apparatus of claim 1:
 said aqueous liquid inlet being a nozzle oriented within said mixing chamber so as to direct the spray upward.
8. In the apparatus of claim 1:
 a second valve within said fluid line for regulating the flow of said air vapor mixture from the apparatus into the intake manifold.
9. In the apparatus of claim 8:
 a dispersing head within said fluid line for dispersing the air vapor mixture.
10. In the apparatus of claim 1:
 said air inlet having an air filter means;
 said aqueous liquid inlet being a nozzle oriented within said mixing chamber so as to direct the spray upward;
 said foraminous means comprising a plurality of screens in series;
 said apparatus having a drainage means; and
 said outlet including an outlet port means spaced from said foraminous means and above a base of said foraminous means whereby excess moisture can be removed from said chamber through said drainage means and the passage of droplets out through said outlet port is minimized; and
 a fluid line for interconnecting said outlet port means with said intake system, said fluid line being provided with a valve means which is pressure responsive and opens only when the pressure on upstream side of said valve exceeds the pressure on the downstream side of said valve.

11. Apparatus for supplying an air aqueous vapor mixture into the intake system of an internal combustion engine comprising:
 a reservoir of an aqueous liquid;
 a mixing chamber for mixing air and said aqueous liquid, sait mixing chamber having an air inlet provided with an air filter means, said mixing chamber having an aqueous liquid inlet comprising a spray nozzle which directs a spray into an air stream passing through said mixing chamber from said air inlet to form a mist in the mixing chamber, said mixing chamber having drainage means and said mixing chamber having an outlet for the mixture, said outlet being opposite said air inlet so that air flow from said air inlet carries the mist out, said outlet including foraminous means for catching droplets and from which said droplets vaporize substantially completely into the air prior to introduction of the air vapor mixture into the intake system, said outlet including an outlet port means spaced from said foraminous means whereby excess moisture can be removed from said chamber through said drainage means and the passage of droplets out through said outlet port and into said intake system is minimized; and
 a fluid line for interconnecting said outlet port means with said intake system, said fluid line being provided with a valve means which is pressure responsive and opens only when the pressure on upstream side of said valve exceeds the pressure on the downstream side of said valve.

12. In the apparatus of claim 11:
said foraminous means comprising a plurality of screens in series.

13. In the apparatus of claim 12:
said screens being between 8 and 40 Tyler standard sieve mesh.

References Cited

UNITED STATES PATENTS

| | | | |
|---|---|---|---|
| 1,201,300 | 10/1916 | Hikish. | |
| 1,441,209 | 1/1923 | Bollman | 123—25.52 |
| 1,504,018 | 8/1924 | Berard | 123—25.11 |
| 1,595,704 | 8/1926 | Caldwell | 123—25.1 |
| 1,623,053 | 4/1927 | Howard et al. | |
| 2,681,048 | 6/1954 | Fox | 123—25.52 |
| 3,050,044 | 8/1962 | Anderson. | |
| 1,936,243 | 11/1933 | Anderson | 55—259 |

FOREIGN PATENTS 169,054  9/1921  Great Britain.

JOSEPH SCOVRONEK, Primary Examiner

U.S. Cl. X.R.

55—259; 123—25; 261—18